United States Patent
Will et al.

(10) Patent No.: US 7,628,417 B2
(45) Date of Patent: Dec. 8, 2009

(54) BICYCLE WHEEL SPINNER ASSEMBLY

(75) Inventors: Chris Michael Will, Loveland, OH (US); Aaron Thomas Frankel, Huntington Beach, CA (US); Anthony Joeseph Honerkamp, Cincinnati, OH (US)

(73) Assignee: SpinnerZ, LLC, Loveland, OH (US)

( * ) Notice: Subject to any disclaimer, the term of this patent is extended or adjusted under 35 U.S.C. 154(b) by 337 days.

(21) Appl. No.: 11/624,846

(22) Filed: Jan. 19, 2007

(65) Prior Publication Data

US 2007/0222179 A1  Sep. 27, 2007

Related U.S. Application Data

(60) Provisional application No. 60/743,694, filed on Mar. 23, 2006.

(51) Int. Cl.
*B62J 9/00* (2006.01)
(52) U.S. Cl. ............... 280/288.4; 301/37.25; 301/37.41
(58) Field of Classification Search ............. 280/288.4; 301/37.41, 37.25
See application file for complete search history.

(56) References Cited

U.S. PATENT DOCUMENTS

| 6,793,294 | B2 * | 9/2004 | Shih ..................... 301/37.41 |
| 6,880,897 | B2 * | 4/2005 | Goss et al. ............... 301/6.9 |
| 7,086,706 | B1 * | 8/2006 | Wood .................... 301/37.25 |
| 7,226,132 | B2 * | 6/2007 | Fultz et al. .............. 301/37.25 |
| 7,347,503 | B2 * | 3/2008 | Raddin et al. ............ 301/37.25 |
| 7,427,110 | B2 * | 9/2008 | Miansian et al. ......... 301/37.25 |
| 2002/0036426 | A1 * | 3/2002 | Fowlkes ................. 301/37.25 |

* cited by examiner

*Primary Examiner*—Lesley D Morris
*Assistant Examiner*—Tashiana Adams
(74) *Attorney, Agent, or Firm*—Dinsmore & Shohl LLP

(57) ABSTRACT

A wheel spinner assembly for mounting on a bicycle and enhancement of the bicycle's aesthetic features. The bicycle wheel spinner assembly is adapted for use on a bicycle wheel having an axle and a plurality of spokes, includes a hub assembly, an end cap member and a rotor. The end cap member is operatively connected to the hub assembly and configured to contact an axle of a bicycle wheel and the rotor is operatively connected to the hub assembly and extends radially outwardly therefrom.

10 Claims, 9 Drawing Sheets

BICYCLE WHEEL SPINNER ASSEMBLY

RELATED APPLICATION

The present application claims priority under 35 U.S.C. § 119 of U.S. Application Ser. No. 60/743,694 filed Mar. 23, 2006.

FIELD OF THE INVENTION

The present invention is directed to bicycle wheels, and more particularly to a bicycle wheel provided with a spinner assembly that rotates at a speed independent of the bicycle wheel.

BACKGROUND OF THE INVENTION

Accessories for the wheels of motor vehicles, such as cars and trucks, are well known in the art. For example, many vehicle wheels are provided with chrome wheel rims, illuminating nuts and/or spinning hubcaps. Still other wheel modifications include illuminating features and graphics mounted to the side of the wheel or rim in order to enhance the vehicle's overall aesthetic effect. As such, there are various accessories designed for use in conjunction with the wheels of a vehicle. However, due to the inherent differences between bicycle and car wheels, few bicycle wheel enhancements have been developed.

Additionally, most known enhancement devices attach directly to the vehicle wheel or rim and, therefore, rotate at the wheel's speed and in its direction of rotation. Still other known wheel accessories require the user to remove the wheel assembly from the vehicle in order to attach the accessory. As such, there remains a continuing need for bicycle wheel accessories that is adapted for easy mounting on a conventional bicycle wheel without removal of the wheel and is adapted for rotation at speeds and directions of rotation different than the speed and direction of rotation of the bicycle wheel.

SUMMARY OF THE INVENTION

The present invention provides improvements in bicycle wheel accessories and provides for the easy mounting on a conventional bicycle wheel.

In one embodiment, the bicycle wheel spinner assembly is adapted for use on a bicycle wheel having an axle and a plurality of spokes. The bicycle wheel spinner assembly comprises: a hub assembly, an end cap member, and a rotor. The end cap member is operatively connected to the hub assembly and configured to contact an axle of a bicycle wheel, and the rotor is operatively connected to the hub assembly and extends radially outwardly therefrom.

In another embodiment, the bicycle wheel spinner assembly comprises a bicycle wheel, hub assembly, end cap member, and a plurality of rotors. The bicycle wheel having an axle and a plurality of spokes, the hub assembly adapted to be positioned around the axle, the end cap member operatively connected to the hub assembly and configured to contact the axle, and the plurality of rotors operatively connected to the hub assembly and extending radially outwardly therefrom. The rotor being positioned inside the plurality of spokes.

In an additional embodiment, the bicycle wheel spinner assembly comprises a bicycle wheel, hub assembly, end cap member, a plurality of C-clamps and a plurality of rotors. The bicycle wheel having an axle and a plurality of spokes, the hub assembly positioned around the axle, the end cap member connected to the hub assembly and configured to contact the axle, the plurality of C-clamps positioned around the axle, and the plurality of rotors connected to the hub assembly and extending radially outwardly therefrom. The rotor being positioned inside the plurality of spokes.

Still other embodiments, combinations, and advantages of the present invention will become apparent to those skilled in the art from the following descriptions wherein there are shown and described alternative exemplary embodiments of this invention for illustrative purposes. As will be realized, the invention is capable of other different aspects and embodiments all without departing from the scope of the invention. Accordingly, the drawings, objects, and description should be regarded as illustrative and exemplary in nature only and not as restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

Figure 1:
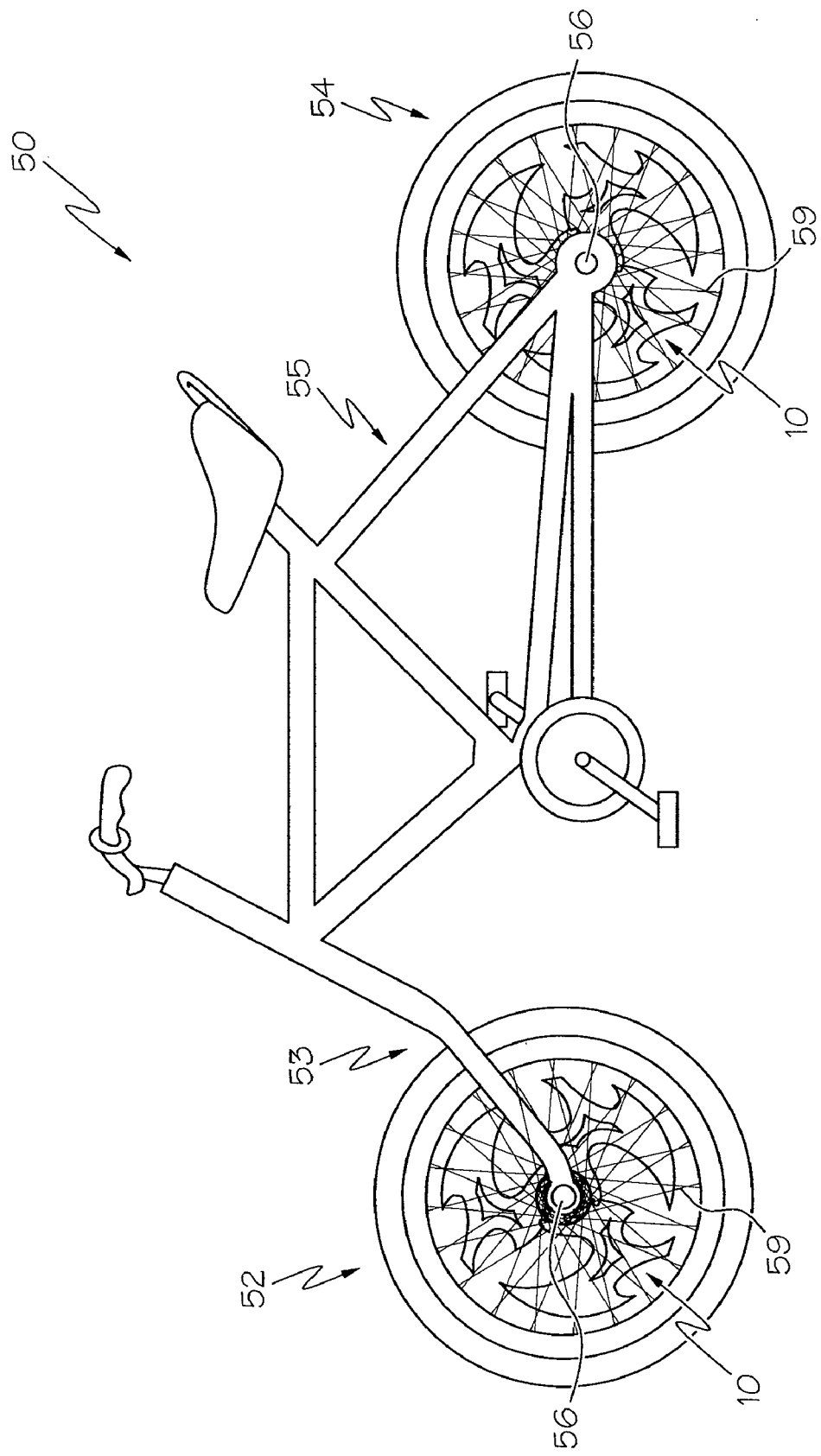
FIG. 1 is a side view of a bicycle with a wheel spinner assembly attached in accordance with certain embodiments of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Figure 2:
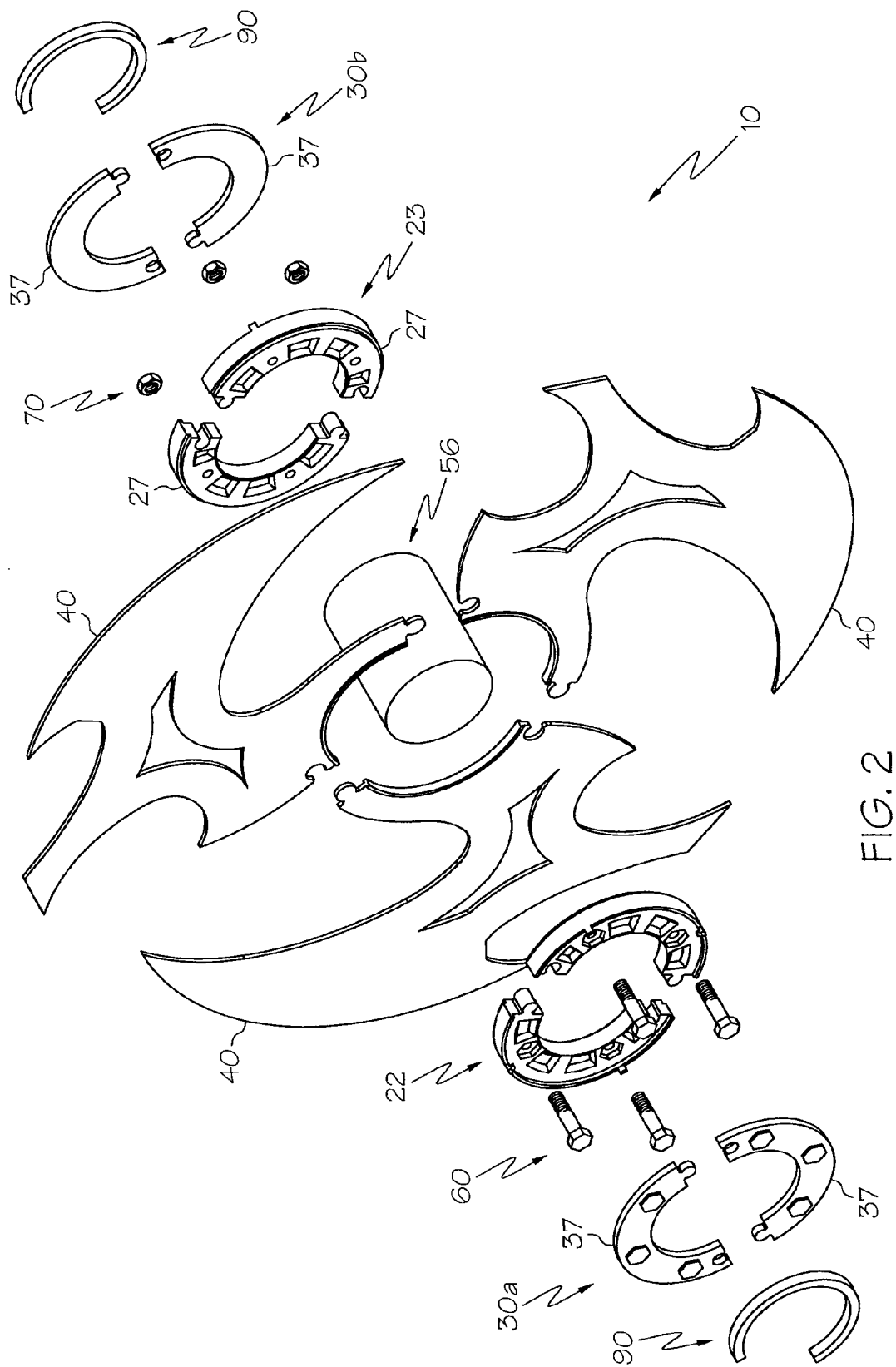
FIG. 2 is an exploded perspective view of an example embodiment of a wheel spinner assembly with C-Clamps, which is made and operates in accordance with principles of the present invention.
Figure 3:
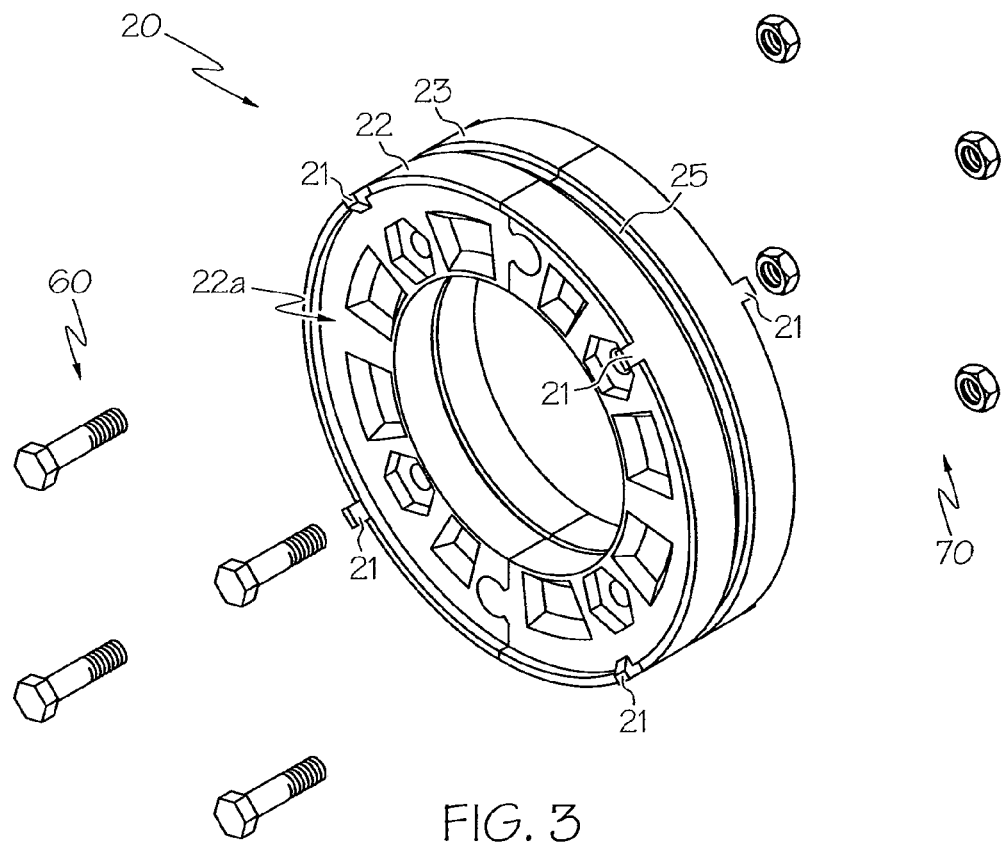
FIG. 3 is an exploded perspective view of an example embodiment of a hub assembly with bolts and nuts in accordance with certain embodiments of the present invention.

Referring to the drawing figures in detail, wherein like numerals indicate the same elements throughout the drawing figures, FIGS. 1-3 illustrate various embodiments of a bicycle wheel spinner assembly and its components. The present invention is directed to wheel spinner assemblies, designated generally as 10 in the drawings, that are adapted to be removably mounted to either the front 52 or back 54 wheel of a bicycle 50. On the front wheel 52, the spinner assembly 10 can be positioned between the front wheel fork 53, inside the spokes 59 and about the front axle 56. Similarly, on the back wheel 54 the spinner assembly 10 can be positioned between the back wheel fork 55, inside the spokes 59 and about the rear axle 56.

Figure 1A:
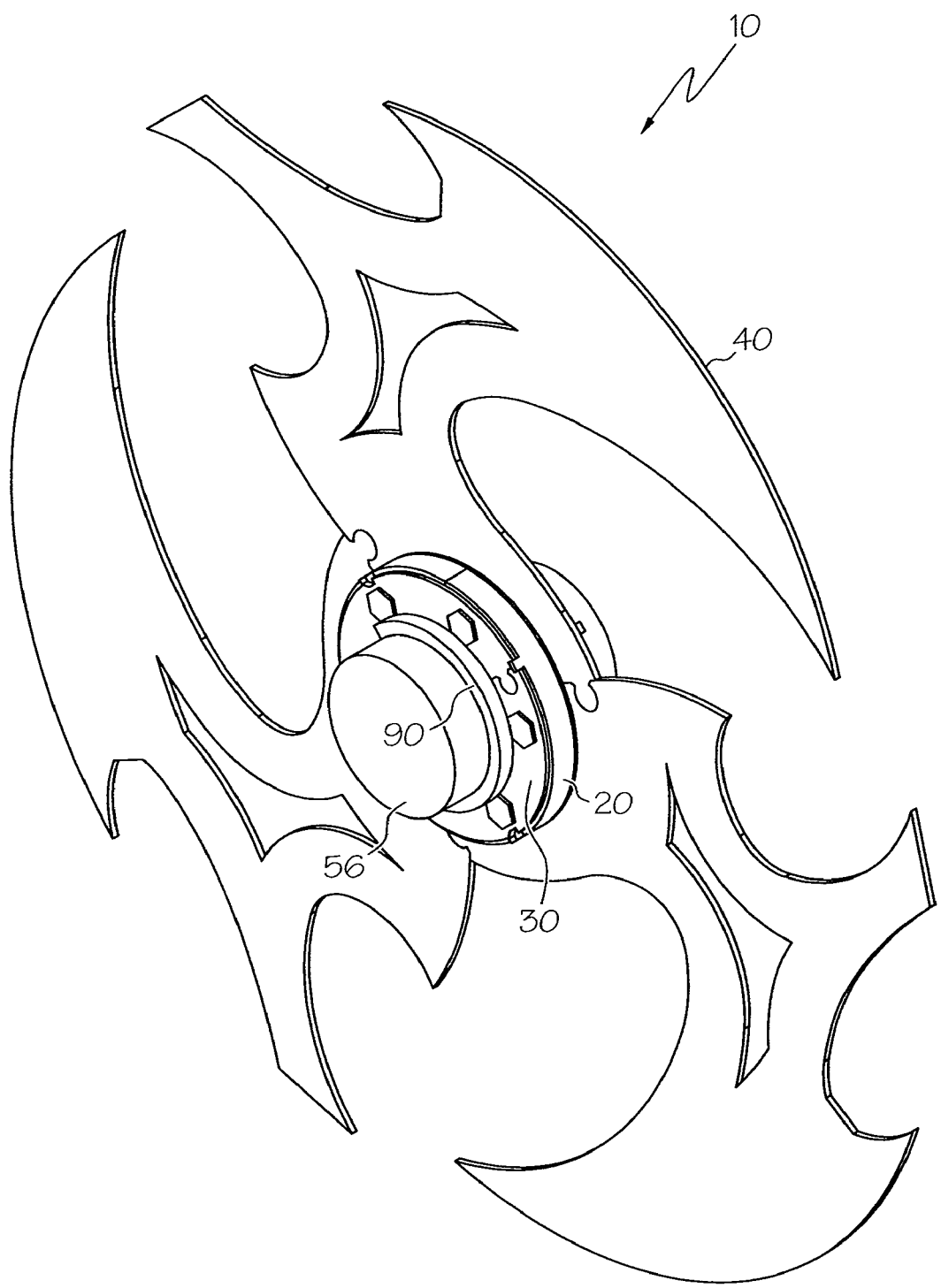
FIG. 1A is a perspective view of an example embodiment of a wheel spinner assembly, which is made and operates in accordance with principles of the present invention.

A wheel spinner assembly 10 according to the present invention, as illustrated in FIG. 1A, comprises a hub assembly 20, an end cap member 30, and a plurality of rotors 40. The size, shape, and color of any component part of the wheel assembly 10 may be varied, as desired, to accommodate, for example, different sized bicycle parts (e.g., wheels, axle, etc.) and for use on different sized bicycles 50.

Figure 4:
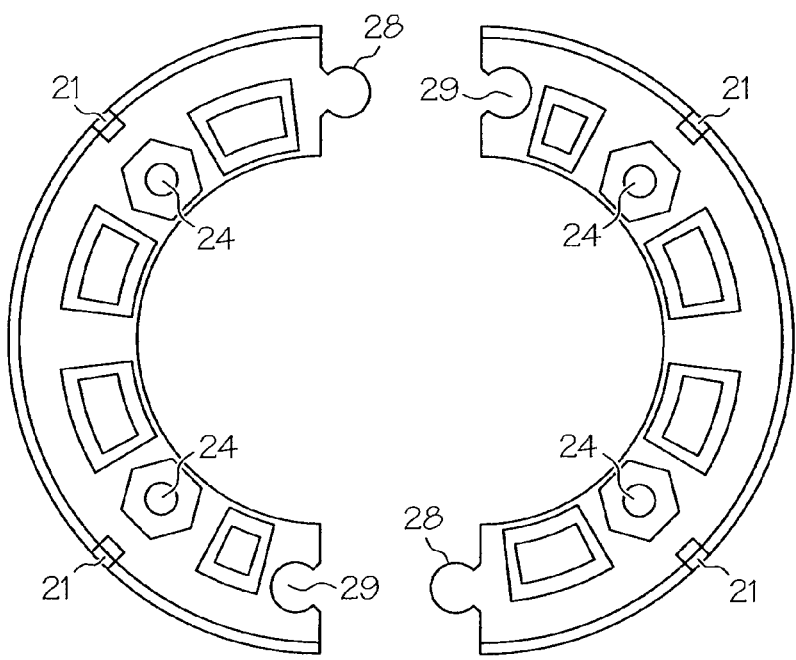
FIG. 4 is a front view of a hub member in accordance with certain embodiments of the present invention.

In the embodiments illustrated in FIGS. 2 and 3, the hub assembly 20 may comprise front and rear hub members 22, 23 adapted to be assembled around either the front or rear axle 56 of the bicycle 50. In another embodiment, the front and rear hub members 22, 23 may be adapted to be assembled around a bearing assembly (not shown) attached to the axle 56. In one specific embodiment, as illustrated in FIGS. 2 and 4, the front and rear hub members 22, 23 may be comprised of hub elements 27 configured to be fitted together and assembled around the axle 56. For example, in the non-limiting embodiment illustrated in FIG. 4, the hub elements 27 may be fitted together through the use of male and female 28, 29 portions to form the hub members 22,23. However, it is envisioned that any means of attachment may be provided for assembly of the hub members 22, 23.

Figure 11:
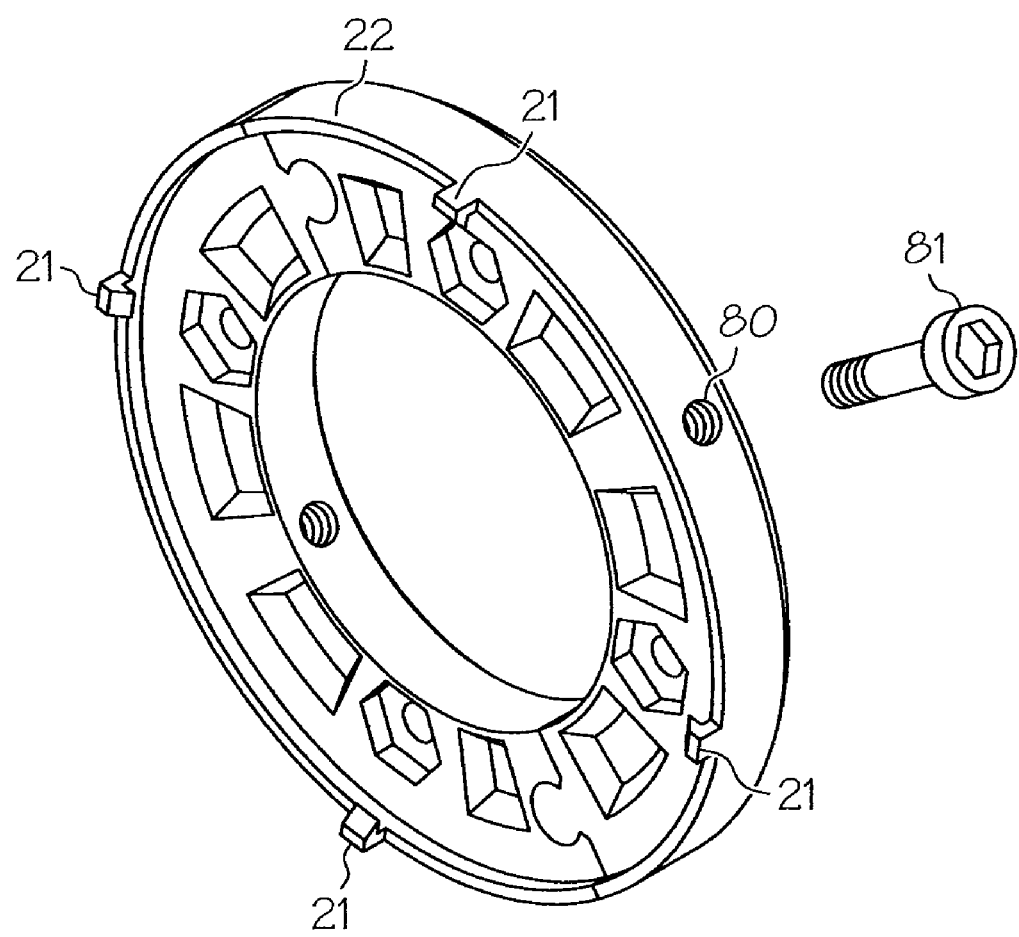
FIG. 11 is a rear perspective view of an example embodiment of a hub member with lock screw in accordance with certain embodiments of the present invention.

In a specific embodiment, as shown in FIGS. 2 and 4, the hub members 22, 23 may be formed with a plurality of through openings 24, each sized and configured to receive a bolt 60 therethrough. In this embodiment, the bolt 60 is adapted to be received in a corresponding nut 70 during assembly of the front and rear hub members 22, 23 around the axle 56. For example, in the assembly of the specific embodiment illustrated in FIG. 3, the bolt 60 may enter and extend through an opening 24 in the outer face of the front hub member 22a, proceed through an opening (not shown) in the rear hub member and engage a nut 70 positioned about the outer face (not shown) of the rear hub member 23. In still another embodiment, as illustrated in FIG. 11, the hub members 22, 23 may be formed with at least one lock aperture 80, sized and configured to receive a lock screw 81 and adapted to prevent rotation of the rotors 40, which are described in further detail herein, when engaged.

Figure 5:
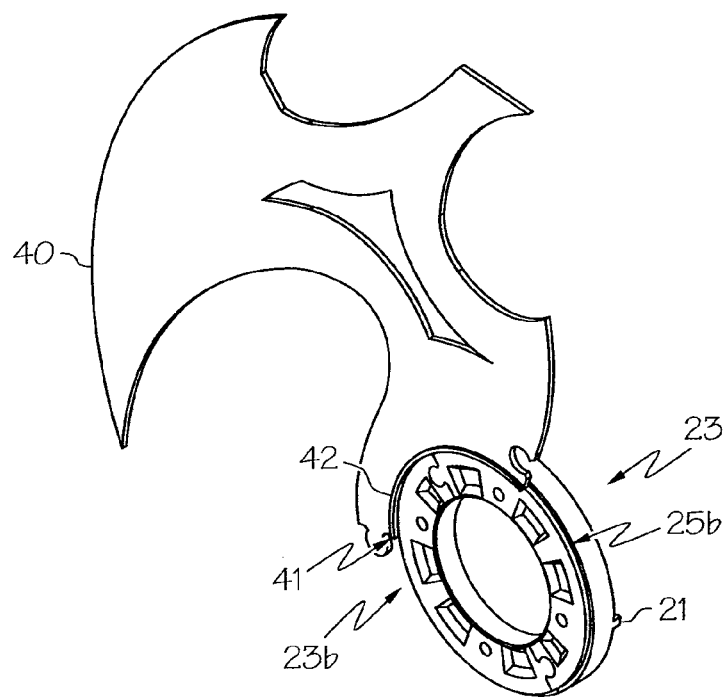
FIG. 5 is a perspective view of an example embodiment of a hub member with rotor adapted in accordance with certain embodiments of the present invention.
Figure 6:
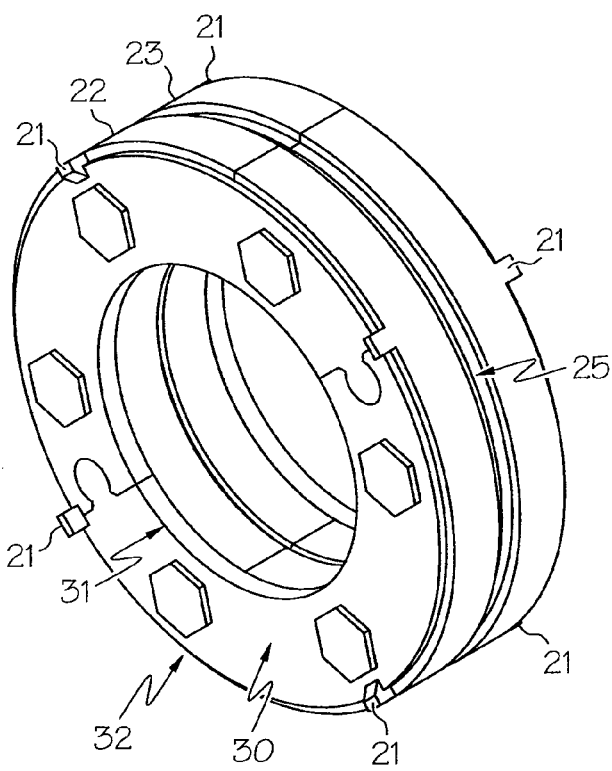
FIG. 6 is a perspective view of an example embodiment of a hub assembly in accordance with certain embodiments of the present invention.

As further shown in FIGS. 3 and 6, the illustrated embodiment of the hub assembly 20 may include a hub groove 25 comprised of both a front (not shown) and rear hub groove element 25b adapted to receive rotors 40. For example, as illustrated in the specific non-limiting embodiment shown in FIG. 5, the rear hub groove element 25b may be positioned about the outer edge portion 26b of the inner face 23b of the rear hub member 23. In another embodiment, for example, the front hub groove element (not shown) may be positioned about the outer edge portion of the inner face (not shown) of the front hub member 22.

In a further specific embodiment, as shown in FIGS. 3-6, the outer faces of the front and rear hub members may include a plurality of end cap member locks 21 positioned about their outer edge portions and adapted to receive and secure an end cap member 30 in assembly of the wheel spinner assembly 10. In one embodiment, the end cap member locks 21 are adapted to contact and engage an outer edge portion 32 of the end cap members 30a, 30b, described in further detail herein. For example, in the non-limiting embodiment illustrated in FIG. 6, the end cap member locks 21 positioned about the outer face of the front hub member 22a may engage the outer edge portion 32 of the front end cap member 30a. Additionally, even though the front and rear hub members 22, 23 are illustrated in FIGS. 3-4 and 6 to include four end cap member locks 21, any number of locks 21 may be used to secure the end cap members 30a, 30b, as desired.

Figure 7:
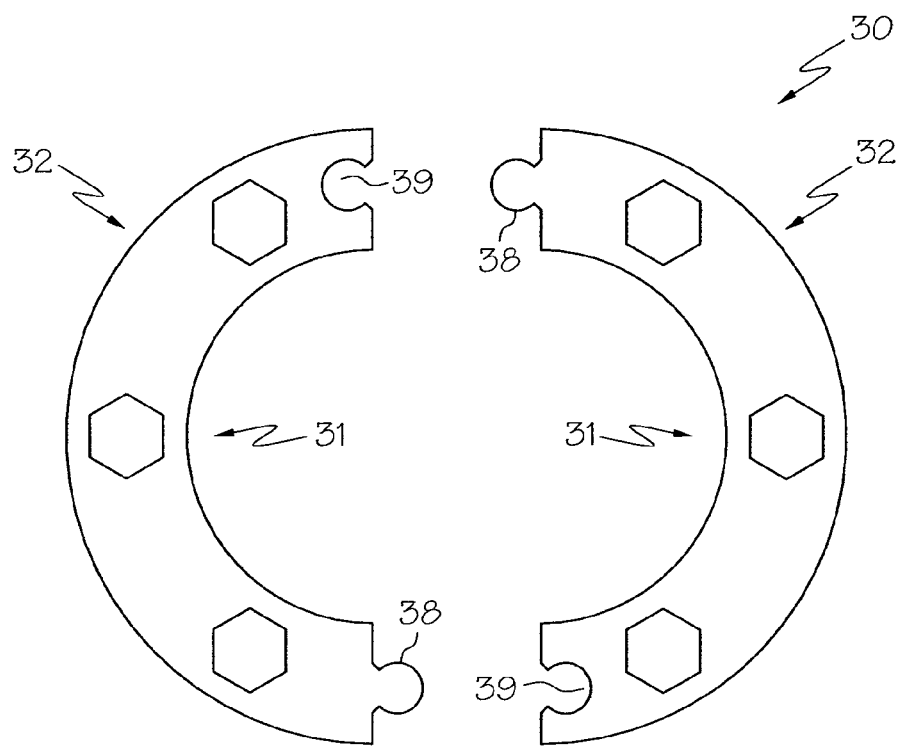
FIG. 7 is a front view of an end cap member in accordance with certain embodiments of the present invention.

As illustrated in the embodiment shown in FIG. 2, the wheel spinner assembly 10 may comprise front and rear end cap members 30a, 30b adapted to be assembled around either the front or rear axle 56 of the bicycle 50. In another embodiment, the front and rear end cap members 30a, 30b may be adapted to be assembled around a bearing assembly (not shown) attached to the axle 56. Additionally, even though the embodiment of the wheel spinner assembly 10, as illustrated in FIG. 2, includes only front and rear end cap members 30a, 30b, any number of end cap members 30 may be used, as desired. In a further specific embodiment, as illustrated in FIGS. 2 and 7, the rear and front end cap members 30a, 30b may be comprised of end cap elements 37 configured to be fitted together for assemble around the axle 56. For example, in one non-limiting embodiment, the end cap elements 37 may be fitted together through the use of male and female 38, 39 portions to form the end cap members 30a, 30b. However, it is envisioned that any means of attachment may be provided for assembly of the end cap members 30a, 30b.

Figure 8:
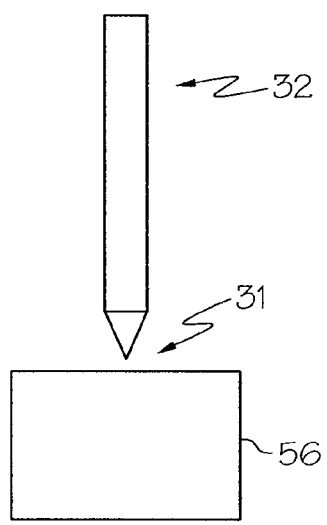
FIG. 8 is a side view of an end cap member in accordance with certain embodiments of the present invention.

In a further specific embodiment, as illustrated in FIG. 8, the end cap members 30a, 30b may comprise an inner edge portion 31 adapted to contact the axle 56 of the bicycle 50. In one embodiment, the inner edge portion 31 increase in thickness as it extends radially away from the axle 56 or, in other words, the edge portion 31 tapers as it approaches the axle 56. Although not intended to be bound by any theory, it is believed that tapered nature of the inner edge portion 31 allows for increased rotation of the spinner assembly 10 about the axle 56 due to the reduced contact area and rotational friction between the end cap member 30 and axle 56. In one embodiment, lubrication may be added to the inner edge portion 31 to increase rotation of the spinner assembly 10 through a reduction in friction.

Figure 9:
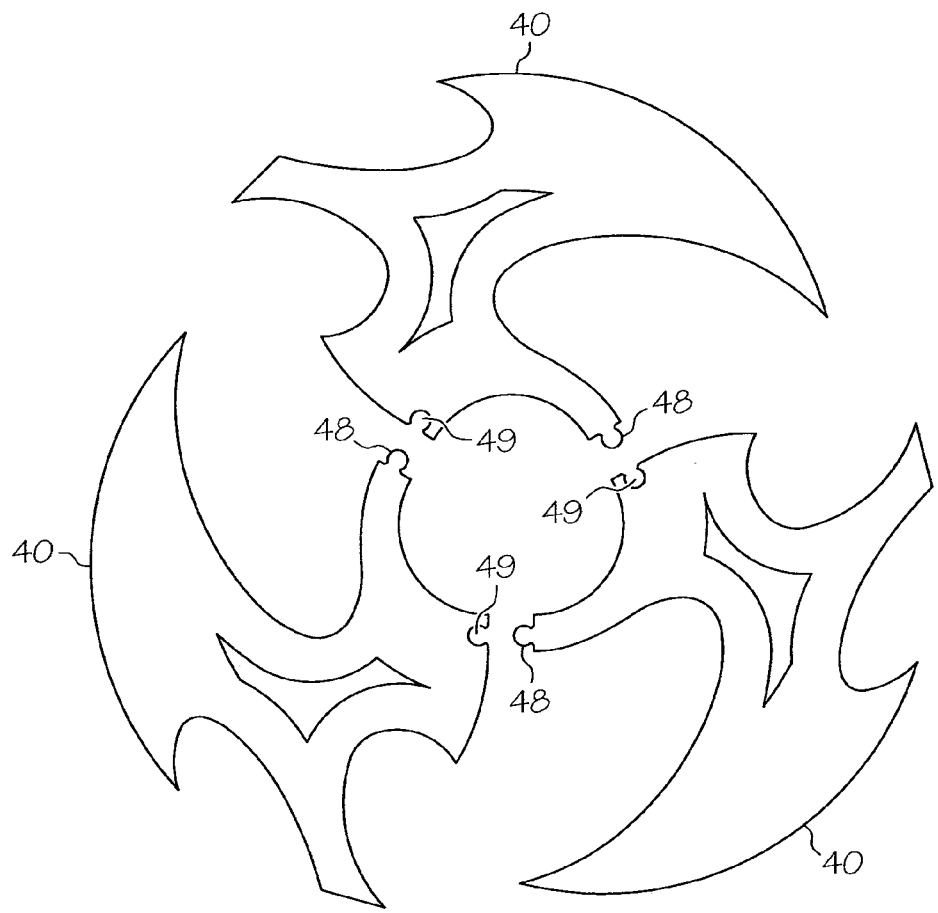
FIG. 9 is a front view of an example embodiment of rotors in accordance with certain embodiments of the present invention.
Figure 12:
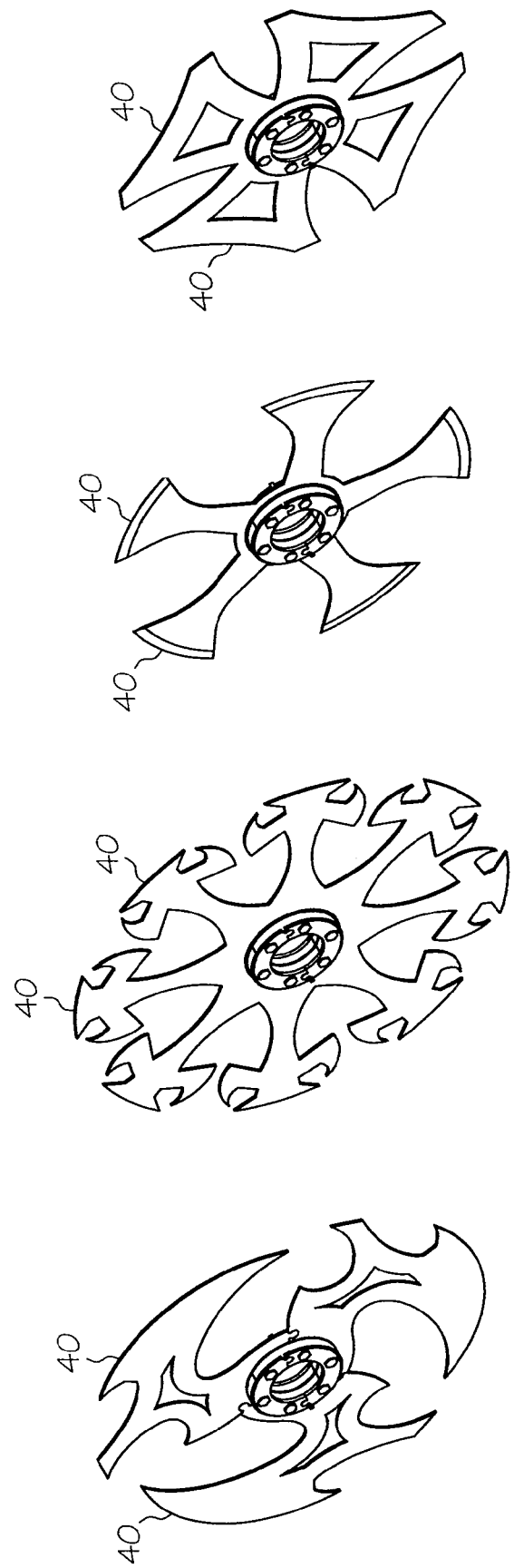
FIG. 12 is a front perspective view of other example embodiments of the wheel spinner assembly, which are made and operate in accordance with principles of the present invention.

As shown in FIGS. 1, 2 and 5 the wheel spinner assembly 10 also includes a plurality of rotors 40 operatively connected to and extending radially outward from the hub assembly 20. In one specific non-limiting embodiment of the present invention, as illustrated in FIG. 2, the wheel spinner assembly 10 comprises three rotors 40. However, it is envisioned in other embodiments, for example FIG. 12, that any number of rotors 40 may be used as desired. In one embodiment, the rotors 40 may comprise rotor lip portions 42 positioned about the inner edge portion of the rotor 41, as illustrated in FIG. 5, and adapted to be received in the hub groove 25. Additionally, as illustrated in the non-limiting embodiment shown in FIG. 9, the rotors 40 may be fitted together through the use of male and female 48, 49 portions to form the rotors 40. However, it is envisioned that any means of attachment may be provided for assembly of the rotors 40.

Figure 10:
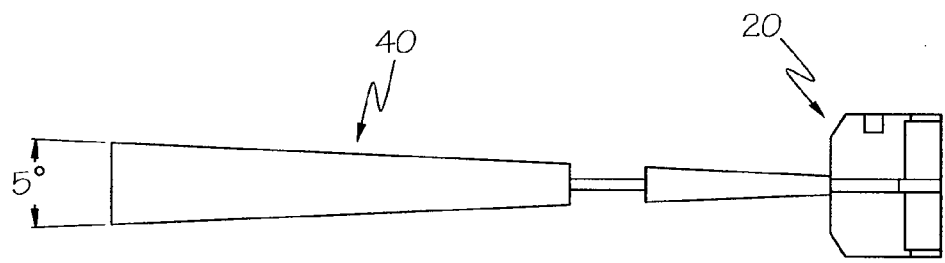
FIG. 10 is a side view of a rotor in accordance with certain embodiments of the present invention.

In one embodiment, as illustrated in FIG. 10, the rotors 40 may increase in thickness as they extend radially away from the hub members 22, 23 or, in other words, the rotors 40 taper as they approach the hub members 22, 23. Although not intended to be bound by any theory, it is believed that the tapered nature of the rotors 40 allows for increased rotation of the spinner assembly 10 about the axle 56 due to the increased mass weight towards the outside of the rotors 40 and corresponding increase in the overall angular momentum. Similarly, in yet other embodiments, additional weight may be mounted to the rotors 40 to increase the overall angular momentum and, therefore, rotation of the spinner assembly 10 about the axle 56.

In one embodiment, the rotors 40 may be formed of a thin plastic material that is durable, and, in some embodiments, can be made to appear chrome or metallic. However, it is envisioned, without departing from the scope of the present invention, that the rotors 40 may be formed of any material, can be made to appear in any manner, and can be provided with a variety of accessories. For example, in one embodiment, reflective tape or any other reflective material may be added to the rotors 40 in order to increase overall night visibility. In yet another specific non-limiting embodiment, the rotors 40 can be mounted with lights (e.g., LED, etc.) powered by an energy source provided on the spinner assembly 10 or bicycle 50 (e.g., batteries, solar panels, magnetic induction drawn from the spinning of the assembly 10 about the axle 56, etc.). In another non-limiting embodiment, the rotors 40 can be mounted with a whistle sound device that can utilize the wind during spinning to produce a whistle sound. In still other embodiments, graphics can be added to the rotors 40 by, for example, adhesive labels or paint.

In yet another specific non-limiting embodiment, as illustrated in FIG. 2, the wheel spinner assembly 10 may also be used in conjunction with a C-Clamp 90. In this embodiment, the C-Clamp 90 is adapted to engage the axle 56 and enables the wheel spinner assembly 10 to stay positioned about the axle, as desired. Additionally, although the embodiment of the wheel spinner assembly 10 with C-Clamp 90 members, as illustrated in FIG. 2, only includes two C-Clamp 90 members, any number of C-Clamp members 90 may be used.

In order to assemble an exemplary embodiment of the wheel spinner assembly 10 of the present invention onto a bicycle 50, a C-Clamp 90 may be positioned about the axle 56. Two end cap elements 37 may then be fitted together around the axle 56 to form the rear end cap member 30b. Next, two hub elements 27 may be fitted together around the axle 56 to form the rear hub member 23 with its end cap member locks 21 positioned about the outer face 23a. Additionally, in a specific embodiment, a plurality of nuts 70 are positioned about the outer face of the rear hub member 23a. The rear end cap member locks 21 may then be fitted over the outer edge portion 32 of the rear end cap member 30b. A plurality of rotor 40 may then be fitted together with the rotor lip portions 42 engaging the rear hub groove element 25b.

Similarly, the process of assembly is reversed. Two hub elements 27 may be fitted together around the axle 56 to form the front hub member 22 and slid along the axle so that the rotor lip portions 42 of the rotors may engage the front hub groove element 25a. Next, a plurality of bolts 60 are inserted into the openings 24a in the outer face 22a of the front hub member 22, proceed through an opening 24b in the rear hub member and engage a nut 70 positioned about the outer face of the rear hub member 23a. The bolts 60 and nuts 70 may then by tightened. Two end cap elements 37 may then be fitted together around the axle 56 to form the front end cap member 30a. The front end cap member locks 21 may then be fitted over the outer edge portion 32 of the front end cap member 30a. In a specific embodiment, a C-Clamp 90 may then be positioned about the axle 56 next to the front end cap member 30a. As such, the wheel spinner assembly 10 may be assembled and positioned without removal of the bicycle wheel. Additionally, since the wheel spinner assembly 10 may be positioned inside the existing spokes 59 of the bicycle 50, the present invention prevents users from accidentally being injured due to objects (e.g., fingers, toes, etc.) unintentionally coming into contact with the rotating rotors 40.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, some principles of the invention may be used in different bicycle configurations and types of wheels. Moreover, although multiple inventive aspects have been presented, such aspects need not be utilized in combination, and various combinations of inventive aspects are possible in light of the various embodiments provided above. Accordingly, the above description is intended to embrace all possible alternatives, modifications, combinations, and variations that have been discussed or suggested herein, as well as all others that fall with the principles, spirit and broad scope of the inventions as defined by the claims.

What is claimed is:

1. A bicycle wheel spinner assembly adapted for use on a bicycle wheel having an axle and a plurality of spokes, comprising:
    a hub assembly comprising a hub grove;
    an end cap member operatively connected to the hub assembly and configured to contact an axle of a bicycle wheel; and
    a rotor received in the hub groove and extending radially outwardly therefrom, wherein the rotor can rotate within the hub groove.

2. The spinner of claim 1, wherein the hub comprises a plurality of hub members configured to form the hub assembly.

3. The spinner of claim 1, wherein the hub comprises end cap member locks adapted to receive the end cap member.

4. The spinner of claim 1, wherein the rotor is supported between a plurality of spokes of the bicycle wheel.

5. The spinner of claim 1, wherein the rotor has a cross-sectional thickness that increases radially outwardly from the hub assembly.

6. The spinner of claim 1, wherein the rotor comprises plastic.

7. The spinner of claim 1, wherein the end cap comprises an inner edge portion having a cross sectional thickness that increases radially outwardly from the hub assembly and is configured to contact the axle of the bicycle wheel.

8. The spinner of claim 1, wherein a reflective object is added to the rotor.

9. A bicycle wheel spinner assembly, comprising: a bicycle wheel having an axle and a plurality of spokes; a hub assembly positioned around the axle, the hub assembly comprising a hub groove; an end cap member connected to the hub assembly and configured to contact the axle; a plurality of C-clamps positioned around the axle; and a plurality of interlocking rotors received in the hub groove and extending radially outwardly therefrom, wherein the rotors can rotate within the hub groove and the rotors are positioned inside the plurality of spokes.

10. The spinner of claim 1, wherein the rotor is adapted to accommodate additional weights.

\* \* \* \* \*